United States Patent [19]

Gapp et al.

[11] Patent Number: 5,083,888
[45] Date of Patent: Jan. 28, 1992

[54] COMPOSITE THREADED COLLAR

[75] Inventors: Roland H. Gapp, South Laguna; Clyde D. Simmons, Riverside, both of Calif.

[73] Assignee: Textron Inc., Providence, R.I.

[21] Appl. No.: 472,019

[22] Filed: Jan. 30, 1990

[51] Int. Cl.⁵ .................. F16B 31/00; B21D 53/24
[52] U.S. Cl. ........................ 411/5; 411/427; 411/908; 10/86 R
[58] Field of Search .......................... 411/3–5, 411/427, 436, 900, 904, 908; 10/86 R; 156/250

[56] References Cited

U.S. PATENT DOCUMENTS

| | | |
|---|---|---|
| 2,901,455 | 8/1959 | Jurras . |
| 2,943,967 | 7/1960 | Simon . |
| 2,949,054 | 8/1960 | White . |
| 3,061,888 | 11/1962 | Wadham ........................ 411/908 |
| 3,495,494 | 2/1970 | Scott . |
| 3,978,761 | 9/1976 | Sosinski ........................ 411/5 |
| 4,326,825 | 4/1982 | Volkmann et al. ............ 411/5 |
| 4,576,847 | 3/1986 | Tajima . |
| 4,623,290 | 11/1986 | Kikuzawa et al. . |
| 4,717,302 | 1/1988 | Adams et al. . |
| 4,909,690 | 3/1990 | Gapp et al. ................... 411/908 |

FOREIGN PATENT DOCUMENTS

| | | | |
|---|---|---|---|
| 1521125 | 4/1968 | France ........................ 411/908 |
| 558892 | 2/1975 | Switzerland . |
| 1155708 | 6/1969 | United Kingdom . |
| 1364076 | 8/1974 | United Kingdom . |

Primary Examiner—Neill R. Wilson
Attorney, Agent, or Firm—Knobbe, Martens, Olson & Bear

[57] ABSTRACT

A composite threaded collar is fabricated from a panel consisting of multiple layers of fiber reinforced tape, bonded together to form a rigid composite structure. The tape comprises a plurality of longitudinally extending continuous fibers that are joined together by a suitable bonding agent. The stack of properly oriented tape layers is heated while a compressive load is applied, followed by cooling. The rigid panel thus formed is then cut, tapped and machined to form the desired configuration of the collar. A twist off driving portion of the collar will shear between tape layers at an annular notch at a predetermined torque.

11 Claims, 3 Drawing Sheets

COMPOSITE THREADED COLLAR

FIELD OF THE INVENTION

The present invention relates generally to the field of threaded locking fasteners. More specifically, the present invention is directed toward a composite threaded collar and method of making the same.

BACKGROUND OF THE INVENTION

As is now well known, the use of composite material in the construction of military and commercial aircraft is widespread and increasing. The most commonly used composites consist of a polymer matrix reinforced with fibers of such materials as carbon, glass or Kevlar.

In many cases, relatively thin panels are used. At the present time, panels 0.088" to 0.189" in thickness appear to be common, although thicker and thinner parts are also used.

To fasten such panels together, adhesive bonding is used wherever possible. When adhesive bonding alone is judged insufficient, fasteners are used in addition. When panels must be removed for service or other purposes, fasteners are used without any adhesive. Because many of the composite sheet thickness are not very different from the metal sheet thickness which have been used in aircraft construction for many years, many of the same metal fasteners which have been used and proven to be reliable in metal sheet can be used in composite sheet.

An example of such a fastener is the metal threaded shear pin and collar, hundreds of millions of which have been used in the aircraft industry over the past twenty years. This fastener looks like a nut and bolt, but is designed with a head and a threaded collar of minimum size to save weight. These size reductions are possible because shear pin fasteners are designed to carry mainly shear loads because joints in thin sheet seldom exert high tensile loadings on the fasteners installed in them.

A frequently used such shear pin for fastening composite is made from 6AL4V titanium, and a commonly used threaded collar or nut is made from A286 stainless steel or 6AL4V titanium. A much lighter nut made from aluminum would enable the full shear strength of the joint to be developed in most cases, but the corrosion rate of the aluminum is so seriously increased when in contact with carbon fiber reinforced composite that its use has been ruled unacceptable. Contact with carbon fiber composites increases the corrosion rate of A286 stainless steel a little, and that of 6AL4V titanium not at all, and is acceptable in most cases.

Thus, a need exists for a collar having the strength of an aluminum collar which is corrosion compatible with carbon reinforced composite and has the same or lighter weight.

SUMMARY OF THE INVENTION

Briefly, the present invention provides a composite threaded collar which closely approximates the strength of an aluminum collar, and is corrosion compatible with carbon reinforced composite material and at 0.058 pounds per cubic inch, is about one-half the weight of aluminum (density 0.102 pounds per cubic inch). The composite collar is also about ⅕ the weight of A286 stainless steel (density 0.286 pounds per cubic inch) and about ⅓ the weight of 6AL4V titanium (density 0.160 pounds per cubic inch).

Composite threaded collars have been made by injection molding and the tension strength with a 1/4-28 thread has been found to be about 1,300 pounds. Somewhat high values were obtained with compression molded collars, but only with the method of the present invention was it found possible to meet and satisfactorily exceed the 3,000-pound minimum ultimate tensile strength called for in the most commonly used 1/4-28 shear pin collars made from 2024 T6 aluminum. Furthermore, it was found possible to meet this tensile strength requirement in the composite nut without any significant departure from the dimensions used on the aluminum nut. The composite threaded collar of the present invention is fabricated from a panel consisting of multiple layers of fiber-reinforced tape, bonded together to form a rigid composite structure. The reinforcing fibers in the tape are elongate filament fibers which extend generally parallel to each other and are coated with a suitable polymeric resin, or other suitable bonding agent. The tape layers are oriented such that their fibers maximize the strength of the collar.

The threaded collar made in accordance with the present invention has three portions: a driving portion, having an array of driver-engaging surfaces, suitable for engagement by a driving tool; a threaded nut portion suitable for threaded engagement with a shear pin; and a twist off notch, disposed between the nut and driving portions and adapted to shear off at a predetermined torque. With the laminated structure of the present invention, there are no fibers running parallel to the direction of the axis of the collar. Preferably, the fibers run substantially perpendicular to the axis. Thus, the shearing of the driving portion from the threaded nut portion occurs at the twist off notch in the laminated structure between successive layers, or tape plies.

In accordance with a preferred method of the invention, a rigid composite panel is made by stacking layers, or plies, of unidirectional fiber reinforced tape. The tape comprises a plurality of longitudinally extending continuous fibers that are joined by resin or another suitable bonding agent. The tape plies are oriented so that the fibers extend in the desired direction. Preferably, the plies are oriented such that the fibers in each tape ply are disposed at a predetermined angle with respect to the fibers in an adjacent ply so as to optimize the axial shear strength of the threads in the resulting composite threaded collar. Once the desired height of the stack has been established, the stack of plies is heated while a compressive load is applied, followed by cooling. This creates a rigid panel of desired thickness, length and width.

The face of the panel is then marked for cutting into small squares, or blanks, such that the sides of each blank, after cutting, will have a length at least equal to the outside diameter of the threaded collars to be fabricated. Each blank is then drilled with a through hole and then tapped. As a final step, the outside diameter and configuration of the collar are generated from the blank.

DETAILED DESCRIPTION OF THE PREFERRED EMBODIMENT

Figure 1:
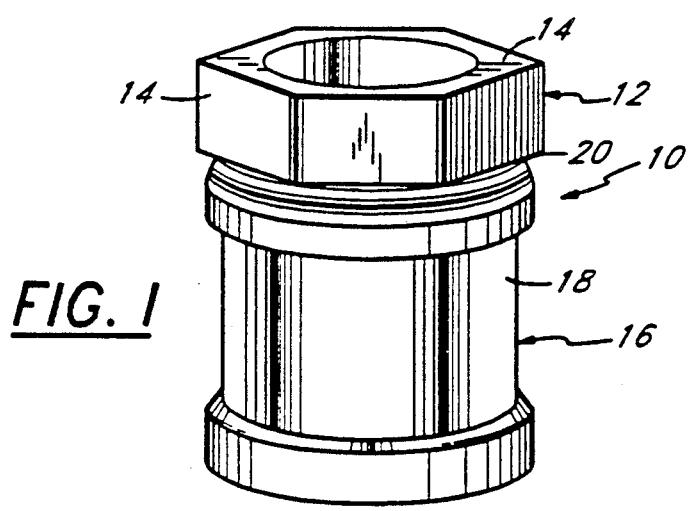
FIG. 1 is a top perspective view of a threaded collar made of composite material in accordance with the invention.
Figure 2:
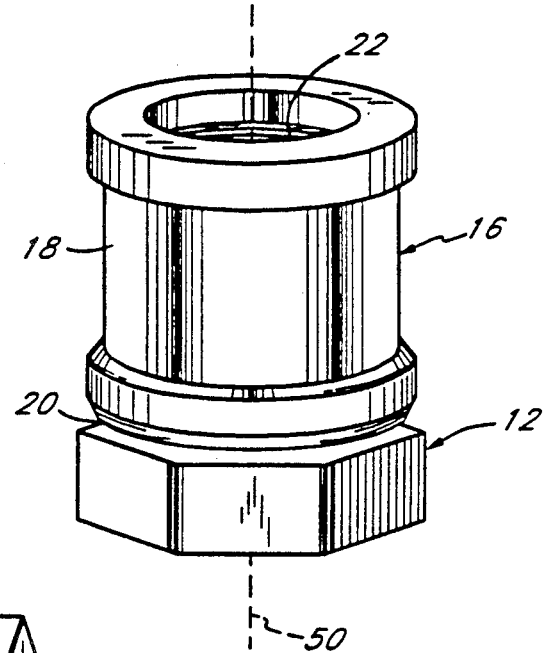
FIG. 2 is a bottom perspective view of the threaded collar shown in FIG. 1.
Figure 3:
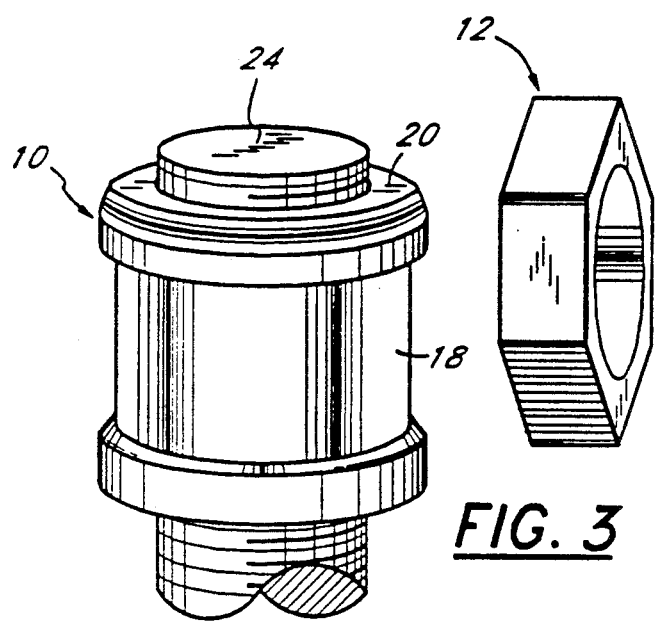
FIG. 3 is a perspective view of the threaded collar on a threaded pin after the driving portion has been sheared off.

Referring now to FIGS. 1 through 3, there is shown generally at 10 a threaded collar made in accordance with the present invention. The threaded collar 10 comprises three portions: a driving portion 12; a threaded nut portion 16 axially aligned with the driving portion 12; and a twist off notch 20, disposed between the nut portion 16 and the driving portion 12. The driving portion 12 has an array of driver engaging surfaces 14 to facilitate engagement of a driving tool (not shown). The nut portion 16 has a composite body 18 and exhibits a plurality of internal threads 22 for threadedly engaging a shear pin 24 (FIG. 3). The twist off notch 20 is configured so that the driving portion 12 will twist off at a predetermined torque, as shown. This configuration may be varied using different depths of the twist off notch 20, as is well known to one of ordinary skill in the art.

Figure 4:
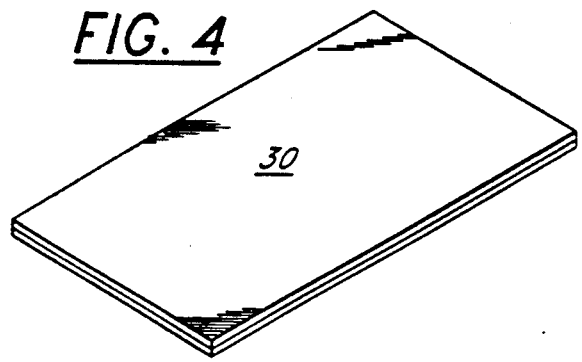
FIG. 4 is a perspective view of a panel made of composite material used for making threaded collars of the invention.
Figure 5:
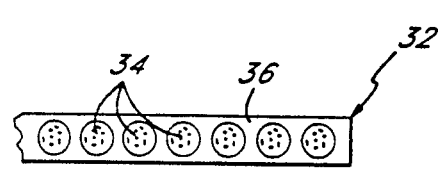
FIG. 5 an enlarged end view of the tape used in making the panel of FIG. 4.
Figure 6:
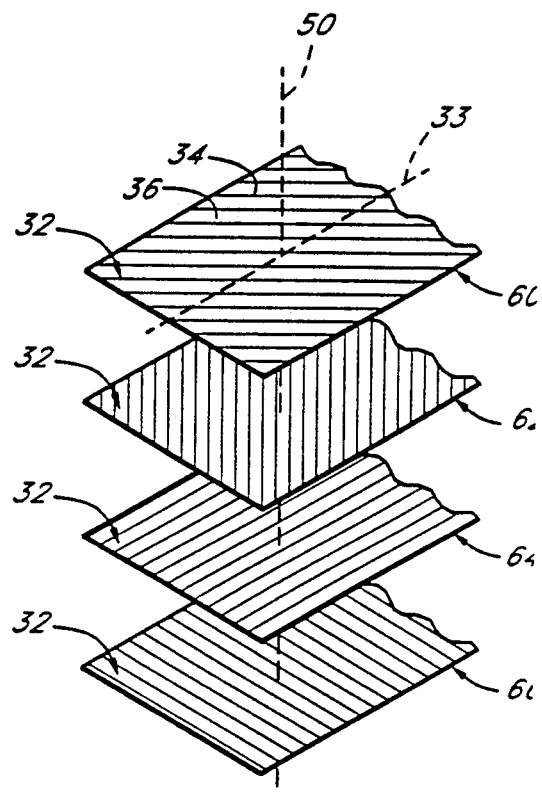
FIG. 6 is an exploded perspective view of a stack of tape plies in which the fibers in successive tape plies are disposed at a predetermined angle with respect to each other.

The threaded collar 10 of the present invention is fabricated from a panel of composite material 30, as shown in FIG. 4. Initially, as illustrated in FIGS. 5 and 6, the composite material is formed in thin sheet-like tapes 32, called plies, which contain unidirectional fibers 34 which add to the strength of the plies. A suitable tape ply has a thickness of 0.005 inches, but other thicknesses can be utilized. Each tape ply 32 comprises a plurality of longitudinally extending continuous fibers 34 which are twisted or otherwise held together in a bundle, referred to as a tow. The tows of fibers 34 are closely spaced, small in diameter and joined by resin or other suitable bonding agents 36, as schematically illustrated in FIG. 5. One example of a suitable composite tape is carbon filament fibers coated with a suitable polymeric resin such as polyetheretherketone (PEEK). As will be appreciated from FIG. 5, the tows of carbon fibers 34 are generally parallel to each other. Parallel alignment of the fibers 34 greatly increases the strength of the tape plies 32, both in the longitudinal direction (tension strength) of the fibers 34 and in the direction perpendicular (shear strength) thereto. The tape plies 32 can be made into panels 30 as illustrated in FIG. 4 by stacking the plies 32 on top of each other to the desired thickness.

For example, to make a panel ½ inch thick, 100 plies 32 of 0.005 inch tape are stacked one on top of the other. After having stacked the plies 32 in layers at the proper angular orientation for maximum shearing strength of the threads in the threaded collar, and having achieved the desired height of the stack, the plies 32 are then heated to an elevated temperature, while at the same time applying a compressive load. By way of example, the stack of plies 32 is typically compressed in three steps of 70, 200 and 300 psi, as it is heated to about 720° F. The heat causes the PEEK 36 to melt and flow, while the compressive load forces the fibers 34 into intimate contact. Upon cooling, the PEEK solidifies, resulting in a reinforced panel 30.

Figure 7:
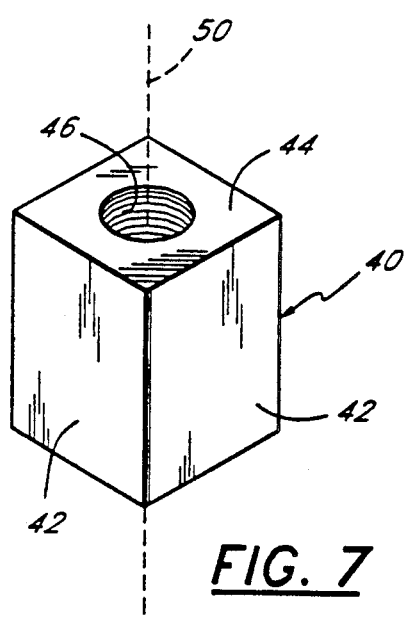
FIG. 7 is a schematic illustration of a blank cut from the panel of FIG. 4.

To use the resultant panel 30 to make a threaded collar, the face of the panel 30 is cut into small squares, or blanks 40, as shown in FIG. 7. Typically, the sides 42 of each blank 40 have a width slightly greater than the outside diameter of the collar 10 to be fabricated. Preferably, the blank 40 is cut from the panel 30 so that the longitudinal axis 50 of the blank 40 is perpendicular to the fibers 34 in the plies 32 of panel 30, and perpendicular to the face of the panel. The face 44 of the blank 40 is then drilled with a through hole and tapped with a suitable tool (not shown) to form a threaded hole 46. Preferably, the threaded hole 46 is formed along the longitudinal axis 50 and substantially perpendicular to the fibers 34 and panel face 30. Subsequently, each tapped blank 40 is screwed onto a threaded mandrel (not shown) and the outside configuration of the collar 10 is then generated from the blank 40. Advantageously, the twist off notch 20 is dimensioned such that the driving portion 12 will twist off at a predetermined torque. For the given example of a 1/4-28 threaded collar 10, the twist off torque is in the range of 60 to 80 inch-pounds. It should be noted that although a threaded collar 10 is shown and described herein, other threaded structures may also be fabricated by the same methods.

Preferably, as schematically illustrated in FIG. 6, the tape plies 32 are oriented in parallel planar relationship so that the fibers 34 within each tape ply 32 are angularly disposed at a predetermined angle to the long axis 33 of the panel 30, which can be thought of as a 0° line.

It was determined that the optimum lay up to maximize the strength of a threaded collar of typical dimensions is 45°/135°/0°/90°. That is, referring to FIG. 6, the fibers 34 of the top ply 60 are at 45° with respect to axis 33 which may be considered as a 0° line; the fibers of ply 62 are at 135° with respect to the 0° line; the fibers of ply 64 are at 0°, or parallel to axis 33; and the fibers of layer 66 are at 90°, perpendicular to the axis 33. The pattern is then repeated. For reasons which are not fully understood, this lay up provides the optimum resistance to threads stripping when the typical composite collar of the invention is installed on a 6AL4V titanium shear pin and tested in tension. It will be readily understood that the ultimate tensile strength of a composite nut when tested in this way will usually be equal to the load at which the threads within the nut strip away from the shell by a shearing action.

A less common reason for nut failure under such a tension loading is nut bursting. Bursting is caused by the radially outward loading produced in the nut perpendicular to the nuts' axis, when the angular faces of the nut thread tend to slide up the angular faces of the pin thread, under a tension loading applied to the pin and nut combination. This loading produces a hoop stress in the nut shell and may cause bursting.

Bursting can be prevented by providing a thick wall for the nut; however, to save weight, it is desirable to design the nut with a wall which is as thin as possible. Again, for reasons which are not fully understood, the 45°/135°/0°/90° lay up provided the maximum resistance to bursting with a given nut wall thickness.

Numerous different lay ups were tried. Nuts made from the eight most promising lay ups were tested in tension with each of three different titanium shear pins having 1/4-28 threads. Nuts made from the four most promising lay ups in the tension test were reduced in diameter by a uniform amount and tested to determine tension load to produce bursting.

Figure 8:
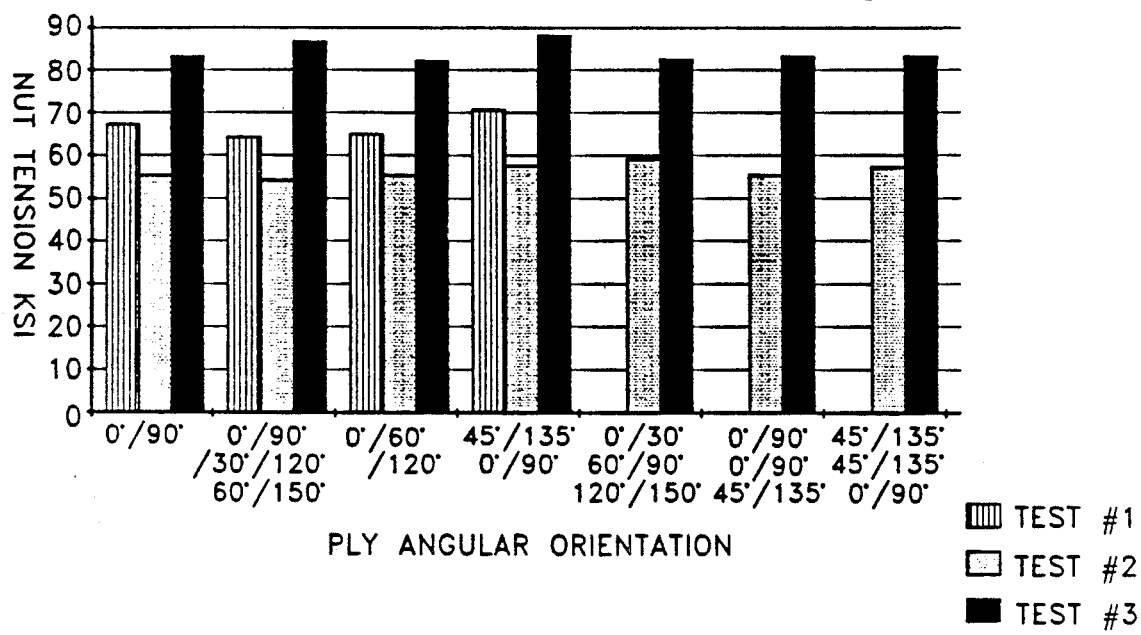
FIG. 8 is a bar chart of tension tests to strip nut threads, with various orientation patterns for the fibers.
Figure 9:
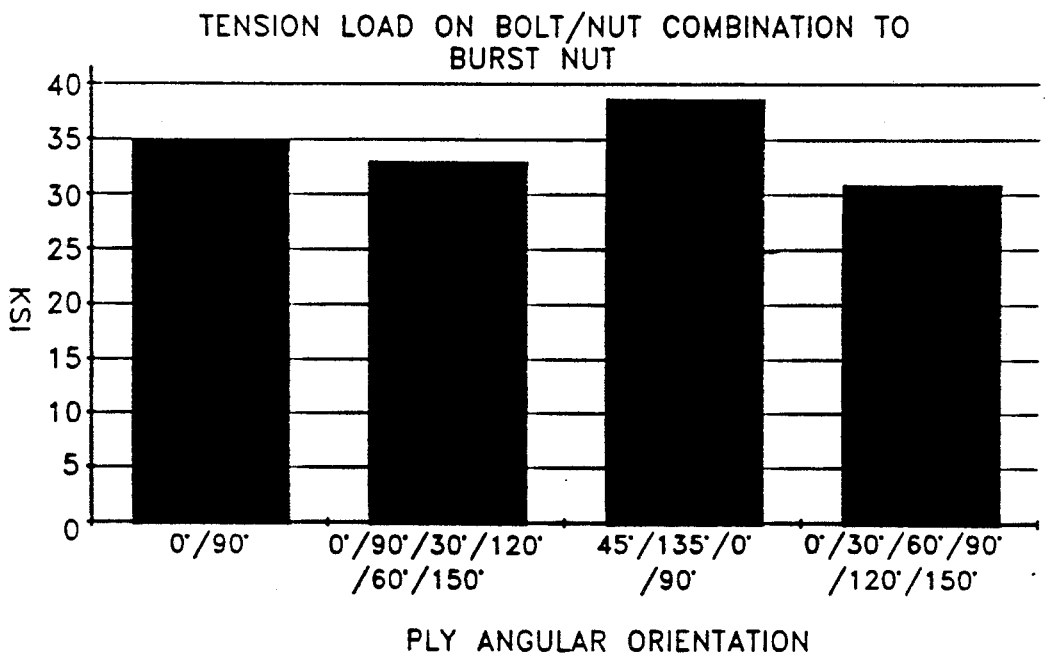
FIG. 9 is a bar chart showing tension loads to burst a nut with various orientation patterns for the fibers.

Tension loads to produce thread stripping and tension loads to produce bursting are shown in the bar charts in FIGS. 8 and 9. The bar graphs identify the fiber angles for each ply, as discussed above. As indicated, the numbers on the horizontal scales refer to the angles of the ply fibers of the various samples tested, with respect to the 0° line in each ply. Thus, for the first sample on each graph, the fibers of the plies simply alternate 90° with respect to each other. That is, the parallel fibers of the first ply are at 90° with respect to the parallel fibers of the second ply. It is apparent that the 45°/135°/0°/90° lay up is optimum. It is also surprising to note from FIG. 8 that all of the lay ups exhibited tension strengths which are approximately three times the 26 ksi tension obtainable with currently available injection molded thermoplastic nuts.

It is noteworthy that the resin areas 36 between fibers 34 in a tape ply 32 provide relatively small resistance to torsional loads. As is apparent from the above description, the fibers 34 are oriented such that there are no fibers 34 running parallel to the direction of the axis 50 of the collar 10 (FIG. 2). Preferably, the fibers 34 are generally perpendicular to the axis 50 of the collar 10. This feature ensures that the driving portion 12 of the collar 10 will shear at the twist off notch 20 between two adjacent plies 32.

The invention has been described in the context of certain preferred embodiments, but these are examples only and the scope of the present invention is not restricted thereto. It will be easily understood by those skilled in the art that other variations and modifications can be easily made within the scope of this invention. For example, tapes consisting of fibers in a thermo setting matrix could be used in place of the thermoplastic resin of the invention. Fibers suitably orientated in a ceramic or metal matrix would be useful. Then sheets consisting of fibers in a metal or ceramic matrix could be layed up and bonded. Alternatively, bare fibers could be suitably orientated in a jig, followed by adding the matrix in a molten state or by a vapor deposition or other suitable processes.

It should also be understood the driver portion of the collar could merely be surfaces on the exterior of the nut portion, for driving the nut, without there being a twist off notch. Thus, the collar might have the appearance of an ordinary metal threaded nut, but has the unique layered composite structure with the fibers of adjacent layers being angled with respect to each other.

What is claimed is:

1. A composite threaded collar for threaded engagement with a shear pin to form a fastener, comprising:
    an internally threaded nut portion for threaded engagement with a shear pin;
    a driving portion axially aligned with said nut portion, said driving portion having a plurality of driver engaging surfaces for driving said nut portion into threaded engagement with said shear pin, said driving portion being adapted to not be in threaded engagement with said pin; and
    a twist-off notch disposed between said nut portion and said driving portion for providing a predetermined location for shearing said driving portion from said nut portion, said collar being fabricated from a panel comprising a plurality of fiber reinforced tapes bonded together to form a rigid composite structure, said tapes being arranged in layers in a manner such that said twist-off notch will shear between two adjacent layers in response to a predetermined torque.

2. The collar of claim 1, wherein said fiber reinforced tapes are formed in plies in which the fibers in a particular ply are substantially parallel to each other.

3. The collar of claim 2, wherein the fibers are oriented generally perpendicular to the longitudinal axis of said collar.

4. The collar of claim 2, wherein said plies are oriented such that the fibers of one ply are disposed at predetermined angles to the fibers of an adjacent ply and to a predetermined line in the same plane as the plies.

5. The collar of claim 4, wherein said predetermined angles are 45°/135°/0°/90°.

6. A threaded collar comprising:
    a driving portion, having a plurality of driver engaging surfaces having a longitudinal axis; and
    a threaded nut portion integral with and longitudinally aligned on said axis with said driving portion, said nut portion and said driving portion being formed from a plurality of fiber reinforced tape plies bonded together to form a rigid composite structure, wherein each of said tape plies comprises a plurality of fibers which are substantially parallel to each other and which are in a plane substantially perpendicular to said axis.

7. The collar of claim 6, wherein said tape plies are layered such that the fibers within each tape ply are disposed at a predetermined angle to the fibers in adjacent tape plies and to a predetermined line in the plane of each of the plies.

8. The collar of claim 7, wherein said angles for four adjacent plies are 45°/135°/0°/90°.

9. A method of making a composite threaded collar, comprising the steps of:
    stacking layers of unidirectional fiber reinforced tape such that the fibers in a given layer are disposed at a predetermined angle to the fibers in an adjacent layer and to a predetermined line in the plane of each of the layers;
    heating and compressing said stack to bond said layers together to form a panel;
    cutting a blank from said panel, said blank having a longitudinal axis substantially perpendicular to said fibers;
    drilling and tapping said blank along said longitudinal axis; and
    forming on the exterior of said blank about said longitudinal axis a driving portion and a nut portion.

10. A method of making a composite threaded collar, comprising the steps of:
    stacking layers of unidirectional fiber reinforced tape such that the fibers in a given layer are disposed at a predetermined angle to the fibers of an adjacent layer and to a predetermined line in the plane of each of the layers;
    heating and compressing said stacked bonded layers together to form a panel;

cutting a blank from said panel, said blank having a longitudinal axis substantially perpendicular to said fibers;

drilling and tapping said blank along said longitudinal axis; and forming on the exterior of said blank about said longitudinal axis a driving portion and a nut portion;

wherein said drilling and tapping step includes forming a threaded nut portion adapted to mate with a threaded pin and a driving portion axially aligned with said nut portion and adapted to rotate with said nut portion without threaded engagement with said pen; and wherein said forming step further comprises providing a twist off notch interposed between said driving portion and said nut portion.

11. A method of forming a composite threaded structure, comprising the steps of:

providing a plurality of unidirectional fiber reinforced tape plies;

layering said plies to form a stack, such that the fibers within a given ply are disposed at a predetermined angle to the fibers in an adjacent ply and to a predetermined line in the plane of the plies;

laminating said stack to form a rigid composite panel; and forming said threaded structure from said panel such that the threads of said structure are formed about an axis which is generally perpendicular to said fibers.

* * * * *

UNITED STATES PATENT AND TRADEMARK OFFICE
CERTIFICATE OF CORRECTION

PATENT NO. : 5,083,888

DATED : January 28, 1992

INVENTOR(S) : Roland Howard Gapp, et. al.

It is certified that error appears in the above-identified patent and that said Letters Patent is hereby corrected as shown below:

Column 1, line 65, change "about 1/3" to --about 1/5--.

Column 2, line 4, change "high" to --higher--.

Signed and Sealed this

Twenty-fifth Day of May, 1993

Attest:

Attesting Officer

MICHAEL K. KIRK

Acting Commissioner of Patents and Trademarks